United States Patent [19]
Mott

[11] 3,728,061
[45] Apr. 17, 1973

[54] MULTI-LAYER SPINNERETTE WITH HEAD FILTER

[76] Inventor: Lambert H. Mott, c/o Mott Metallurgical Corp., P. O. Box Drawer L, Farmington Industrial Park, Farmington, Conn. 06032

[22] Filed: June 24, 1971

[21] Appl. No.: 156,444

[52] U.S. Cl. .................... 425/198, 210/489, 210/496
[51] Int. Cl. .................... D01d 3/00, D29f 3/00
[58] Field of Search ..................... 425/197–199; 210/314, 315, 317, 318, 323, 338, 448, 450, 451, 489, 490, 491, 496

[56] References Cited

UNITED STATES PATENTS

| | | | |
|---|---|---|---|
| 3,570,059 | 3/1971 | Mott | 425/198 X |
| 3,676,193 | 7/1972 | Cooper et al. | 210/490 X |
| 3,485,374 | 12/1969 | Manjikian et al. | 210/323 X |
| 3,442,391 | 5/1969 | Bozek | 210/491 X |
| 1,218,738 | 3/1917 | Zahm | 210/323 X |
| 2,925,913 | 2/1960 | Wheeler | 210/323 |
| 3,268,442 | 8/1966 | Pall et al. | 210/323 X |

*Primary Examiner*—J. Spencer Overholser
*Assistant Examiner*—Michael O. Sutton
*Attorney*—Peter L. Tailer

[57] ABSTRACT

The central cavity of a spinnerette head assembly for the extrusion of synthetic polymer filters is substantially filled with tubular filters closed at one end and communicating with extrusion orifices, the filter area being presented to inflowing plastic being at least twice the cross-sectional area of the central cavity, the tubular filter elements having at least an outer layer with a lesser degree of filtration and an inner layer with a greater degree of filtration.

5 Claims, 3 Drawing Figures

PATENTED APR 17 1973 3,728,061

INVENTOR:
LAMBERT H. MOTT

BY Peter L. Tailer

ATTORNEY

MULTI-LAYER SPINNERETTE WITH HEAD FILTER

BACKGROUND OF THE INVENTION

A conventional spinnerette head assembly for the extrusion of synthetic polymer fibers contains a large central cavity into which plastic material is forced at extrusion pressures. A spinnerette disk is fixed to the spinnerette head assembly and contains small extrusion orifices through which individual fiber strands are extruded. A porous filter is placed in the cavity in front of the spinnerette disk to filter foreign particles from the plastic to prevent clogging of the extrusion apertures. The porous filter also serves to condition the plastic for extrusion as it shears lumps or inconsistencies in the plastic passing through it. This invention provides a superior filter element for use in a spinnerette head assembly.

SUMMARY OF THE INVENTION

A spinnerette head assembly for extrusion of synthetic polymer fibers has a cup shaped holder containing a central cavity, a bottom plate of said holder containing passages, a spinnerette disk containing extrusion orifices fixed below the bottom plate, a filter element having a filter element disk sealed in said cavity above the bottom plate, said filter element disk containing passages therethrough, and tubular filter elements substantially filling said cavity, each tubular filter element having one end fixed to said filter element disk about one of the passages therethrough and each tubular filter element having a closed free end. The outer area of the tubular filter elements is at least twice the cross-sectional area of the central cavity. The filter element disk and the tubular filter elements may be integrally formed of porous metal. All porous filter elements have at least an outer layer with a lesser degree of filtration and an inner layer with a higher degree of filtration.

The spinnerette head filter element of this invention has a much longer service life than conventional filters or even my improved filter shown in my U.S. Pat. No. 3,570,059 in that larger particles are retained by the outer layer with the lesser degree of filtration and smaller particles are removed by the inner layer. Thus the filter of this invention will operate for a longer period of time before clogging enough to lower its effectiveness. In addition, the finer inner layer provides a greater degree of shear which is required to extrude many plastic fibers.

DESCRIPTION OF THE PREFERRED EMBODIMENT

Figure 1:
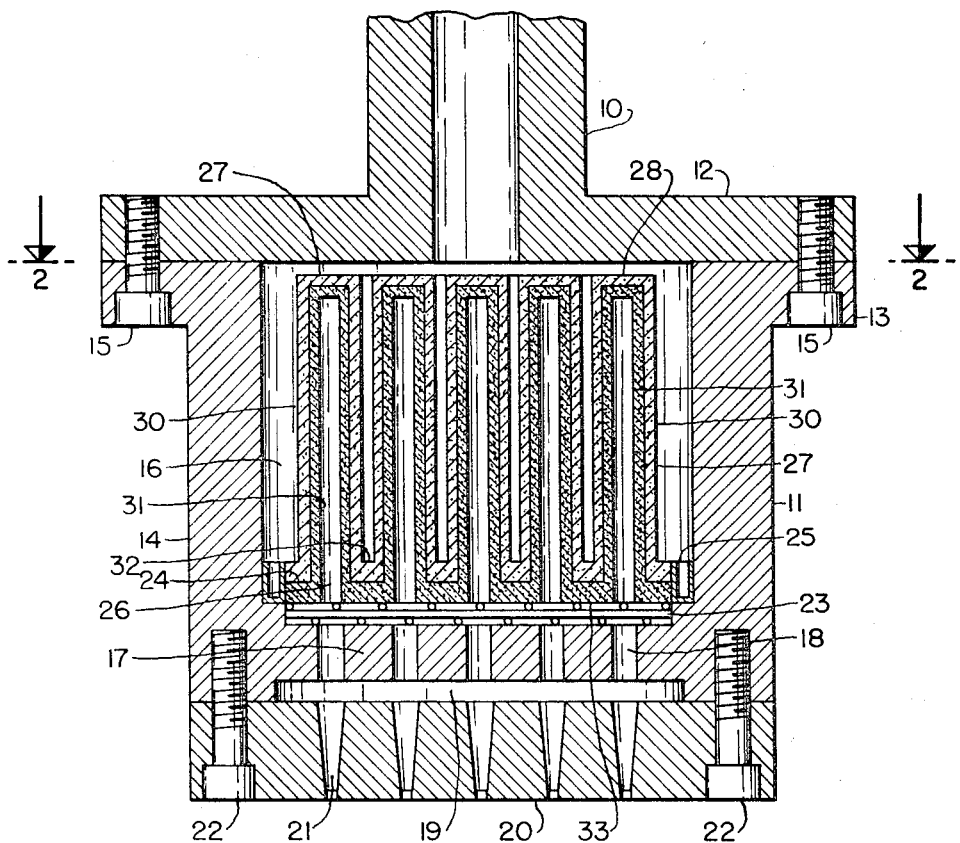
FIG. 1 is a longitudinal section through a spinnerette head assembly showing a filter element therein according to this invention.
Figure 2:
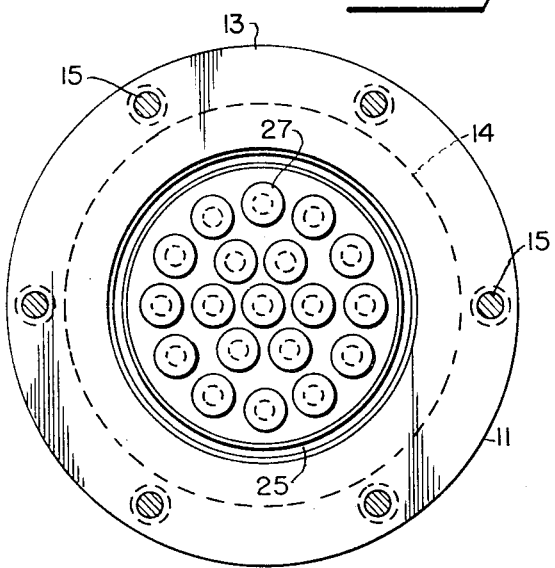
FIG. 2 is a section taken on line 2—2 of FIG. 1.

As shown in FIGS. 1 and 2, plastic at extrusion pressures, which may be several thousand p.s.i., is forced through a feed pipe 10 into the spinnerette head assembly 11. Pipe 10 has a flange 12 formed at its end to which a corresponding flange 13 of the cup-shaped holder 14 is fixed by the bolts 15. Holder 14 contains a large central cavity 16 below which an end wall 17 contains the passages 18. The undersurface of end wall 17 has a circular recess 19 formed therein with which the passages 18 communicate. An extrusion disk 20, known as a spinnerette disk, contains the extrusion orifices 21 through which fibers are extruded. Spinnerette disk 20 is fixed to holder 14 by the bolts 22.

A screen 23 may be disposed over end wall 17 to have filter element disk 24 placed over it. A U-shaped seal 25 or any other equivalent seal of aluminum or other soft material prevents leakage of plastic past the edge of the disk 24. Disk 24 may be of solid metal such as stainless steel, or of porous metal as shown. A plurality of passages 26 extend through disk 24 and are preferably aligned with the passages 18 in end wall 17. A tubular porous filter element 27 is fixed over each passage 26 or integrally formed with disk 24 as shown. The tubular filter elements 27 are closed at their free ends 28. The filter elements 27 extend upward through almost the entire depth of cavity 16 so that they occupy a large portion of the volume thereof above disk 24.

Each tubular filter element 27 has a coarser outer layer 30 and a finer inner layer 31. If the disk 24 is integrally formed with the elements 27 as shown, it also has a coarse upper layer 32 and a finer lower layer 33. While the outer layers 30 and 32 are described as being coarse, they may be formed by compacting and sintering stainless steel particles of a larger size than used to form the layers 31 and 33. Particles of the same size may be used to form the outer layers 30 and 32 and the inner layers 31 and 33, but the inner layers 31 and 33 should then be compacted to a greater density to provide the required greater degree of filtration.

Figure 3:
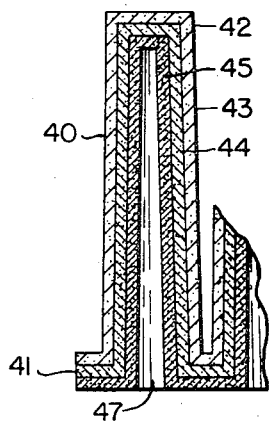
FIG. 3 is a longitudinal, vertical section through a fragment of the edge of a spinnerette head filter element having three layers according to a modification of this invention.

As shown in FIG. 3, a filter element 40 has an integrally formed disk 41 and tubular elements 42. The element 40 has an outer layer 43 with a relatively low degree of filtration, an intermediate layer 44 with a higher degree of filtration, and an inner layer 45 with the highest degree of filtration. As one example of this invention, layer 43 could pass particles up to 70 microns, layer 44 pass particles up to 40 microns, and layer 45 pass particles up to 10 microns. Layer 43 would be made from stainless steel powder passing a 20 mesh screen and caught on a 50 mesh screen, these particles being compacted to between 45 and 75 per cent density before sintering. Layer 44 would be made from powder passing a 50 mesh screen caught on an 80 mesh screen compacted to a density between 45 and 75 per cent. Layer 45 would be made from powder passed by a 100 mesh screen caught on a 200 mesh screen compacted between 45 and 75 per cent density.

The layers 43, 44, and 45 can be separately molded and assembled by placing one upon the other. The tubular elements 42 and their central passages 47 may be tapered to a slight degree for ease of such assembly. Alternatively, one layer may be formed by compacting and sintering and additional layers can be slush cast in place and sintered. Other fabrication techniques may be used.

While I have shown and described my invention in the best forms known to me, it will nevertheless be understood that these are purely exemplary and that modifications may be made without departing from the spirit of the invention.

I claim:

1. A filter element for use in a spinnerette head for the extrusion of synthetic polymer fibers, said spinnerette head having a holder with means securing and sealing said filter element therein, said holder containing a large central cavity in front of said filter element, a pipe introducing plastic at extrusion pressures into the large central cavity of said holder, and a spinnerette disk containing extrusion apertures fixed to said holder below said filter element, said filter element comprising, in combination, a disk containing passages therethrough, and porous metal tubular filter elements fixed to said filter disk over each of said passages, each of said tubular elements having a fixed end fixed to said filter disk and a closed free end, said tubular filter elements having an outer filter area at least twice the cross-sectional area of said cavity, said tubular filter elements having an outer layer with a lesser degree of filtration passing larger particle sizes and an inner layer with a greater degree of filtration passing smaller particle sizes.

2. The combination according to claim 1 wherein said tubular filter elements and said filter disk are formed of sintered powdered metal, said filter disk having an upper layer with a greater degree of filtration and a lower layer with a lesser degree of filtration, said upper layer being contiguous with said outer layer of said tubular elements and said lower layer being contiguous with said inner layer of said tubular elements.

3. The combination according to claim 2 wherein said tubular filter elements and the layers of said tubular filter elements taper, said tubular filter elements each containing a tapering passage, said layers of said filter disk and said tubular filter elements having a greater degree and a lesser degree of filtration being separately formed of sintered powdered metal, said filter elements being assembled by the placing of one layer against another.

4. The combination according to claim 3 wherein said layers having a lesser degree of filtration are formed from powdered metal of a larger mean particle size and said layers having a greater degree of filtration are formed from powdered metal of a smaller mean particle size, the layers being compacted to the same density and sintered.

5. The combination according to claim 2 wherein said filter disk and said tubular filter elements have an intermediate layer with an intermediate degree of filtration.

* * * * *